United States Patent [19]

Terai et al.

[11] Patent Number: 5,295,149
[45] Date of Patent: Mar. 15, 1994

[54] GAS LASER DEVICE

[75] Inventors: Kiyohisa Terai, Kanagawa; Tohru Tamagawa, Tokyo; Takaaki Murata, Mie; Shinji Kobayashi, Kanagawa; Akira Moriguchi, Mie; Hirokatsu Suzuki, Tokyo, all of Japan

[73] Assignee: Kabushiki Kaisha Toshiba, Kawasaki, Japan

[21] Appl. No.: 34,867

[22] Filed: Mar. 19, 1993

[30] Foreign Application Priority Data

Apr. 10, 1992 [JP] Japan .................... 4-090693
May 6, 1992 [JP] Japan .................... 4-112944

[51] Int. Cl.$^5$ .................................. H01S 3/09
[52] U.S. Cl. ............................. 372/69; 372/58; 372/38
[58] Field of Search ............. 372/69, 82, 58, 38, 372/81

[56] References Cited

U.S. PATENT DOCUMENTS

| | | | |
|---|---|---|---|
| 4,823,350 | 4/1989 | Yamazaki | 372/38 |
| 4,837,789 | 6/1989 | Egawa | 372/82 |
| 4,872,178 | 10/1989 | Egawa | 372/82 |
| 4,887,272 | 12/1989 | Karube et al. | 372/82 |
| 4,939,381 | 7/1990 | Shibata et al. | 372/81 |
| 5,142,544 | 8/1992 | Donahue et al. | 372/81 |

*Primary Examiner*—Léon Scott, Jr.
*Attorney, Agent, or Firm*—Oblon, Spivak, McClelland, Maier & Neustadt

[57] ABSTRACT

A gas laser device, including an a.c. power source for generating a.c. output voltage and a pair of electrodes positioned sandwiching discharge gap through which laser gas circulates. The pair of electrodes are connected to the a.c. power source for applying the a.c. voltage across the electrodes to achieve discharge in the discharge gap such as to create a positive column region and boundary layer regions, thereby to generate laser light. The positive column region is created in the discharge gap and a.c. power injected therein contributes to laser excitation. The boundary layer regions is created in a vicinity of one of the pair of electrodes, respectively and a.c. power injected therein does not contribute to laser excitation. A frequency of the a.c. power source is set to at least 700 kHz and an a.c. output voltage of the a.c. power source is set at a level such that a voltage in the positive column region is larger than a burden voltage in the boundary layer regions.

In the gas laser device, it may be set that a dimension d between the pair of electrodes and a pressure p of the laser gas in the relationship of the following formula (A)

$$p \times d \geq 34 \text{ torr·cm} \quad (A)$$

As a result the input power supplied for laser excitation in the discharge gap is at least 50% of a total input power.

10 Claims, 6 Drawing Sheets

GAS LASER DEVICE

BACKGROUND OF THE INVENTION

1. Field of the Invention

The present invention relates to a gas laser device, and more particularly to a gas laser device in which laser light is generated by applying a high-frequency voltage across electrodes to achieve electrical discharge.

2. Description of the Related Art

FIG. 1 shows the longitudinal cross-sectional structure of a so-called cross-flow type of gas laser device in which the gas flow is orthogonal to the output optical axis. In FIG. 1, a metallic inner flume 2 made of, for example, stainless steel, iron or aluminum with a U-shaped cross-section is provided inside an outer flume 1 made of, for example, stainless steel, iron or aluminum with a rectangular cross section. A first tabular dielectric 3a made of ceramic is hermetically attached to the central portion in the top surface of the outer flume 1. A second tabular dielectric 4a is hermetically attached to the inner flume 2 in such a way as to close the opening in the top surface. And the arrangement is such that a discharge gap 5 with a predetermined spacing exists between these dielectrics 3a and 4a. Further, a first electrode 3b is attached to the central portion in the top surface of the first dielectric 3a to form a first dielectric electrode 3. And a second electrode 4b is attached in the central portion in the bottom surface of the second dielectric 4a to form a second dielectric electrode 4 which constitutes a pair with the first dielectric electrode 3. Moreover, the first electrode 3b and second electrode 4b are connected to an a.c. power source 6.

The laser gas is enclosed at the desired pressure in the gap between the outer flume 1 and the inner flume 2, and the inside of the inner flume 2 is connected to the outer atmosphere. A blower 7 for circulating the laser gas in the direction of the arrow A and a heat exchanger 8 for cooling the laser gas after it has flowed through the discharge gap 5 are placed at the bottom on the inside of the outer flume 1.

When an a.c. voltage from the a.c. power source 6 is applied across the first electrode 3b and the second electrode 4b in the laser device with this configuration, an a.c. discharge occurs in the discharge gap 5 via the first dielectric 3a and the second dielectric 4a, the laser gas flowing in the discharge gap 5 is excited and the laser light 9 is produced in a direction orthogonal to the surface of the paper.

As shown in model form in FIG. 2, the physical composition for the discharge in the discharge gap 5 comprises a positive column 10 and boundary layers 11 in the vicinity of the first and second dielectric electrodes 3 and 4. The behavior of the boundary layer 11 depends on the discharge frequency.

Next, in order to raise the laser oscillation efficiency (conversion efficiency from discharge input to laser output) it is necessary to raise the frequency of the a.c. power source. In this case, the a.c. power source of the vacuum tube type is to be used. The efficiency of the a.c. power source (conversion efficiency from 200 V a.c. input power to high frequency output power) is up to 70% in the case of C class amplification type, and is usually 55%. As a result, it is impossible to raise the overall efficiency of the gas laser device (conversion efficiency from 200 V a.c. input power to the laser output power). Besides, the size of the a.c. power source is large, because the power source of the vacuum tube type is used.

Contrary, in order to raise the power source efficiency (maximum about 90%) and to reduce the size of the a.c. power source, it is necessary to use the solid state device in the a.c. power source and to make the frequency of the a.c. power source low (100 kHz). In this case, the laser oscillation efficiency will be reduced, as a result the overall efficiency of the gas laser device will not be raised.

Namely, the power injected to the positive column 10 contributes to laser excitation but the power injected to the boundary layer 11 does not contribute to laser excitation. Gas laser devices with a conventional configuration, however, do not take into account power losses in the region of the boundary layers 11 and therefore experience problems in that the laser oscillation efficiency is low since power loses in the region of the boundary layer 11 account for a large proportion of the overall discharge input.

Moreover, as the output frequency is low which will not give rise to the phenomenon of electron trapping and will make the ignition voltage high. As a result, laser pulse characteristic is also not good. The conventional gas laser device described above suffers from the problems as described above.

Next, the operation of the a.c. power source 6 will be described. The a.c. power source 6 here carries out a continuous (CW) operation and pulse operation. In order to improve the discharge ignition characteristic for the pulse operation, the discharge is ignited by a preliminary ionization means such as Simmer discharge even when the laser pulse is off. The power-source output from the a.c. power source 6 as shown in FIG. 3 therefore has alternate Simmer discharge periods T1 and main discharge periods T2.

The load on the a.c. power source 6 is thus lessened when carrying out the laser pulse operation by reducing the difference between the voltage in the Simmer discharge period T1 and the voltage in the discharge period T2 generated by the a.c. power source 6.

However, conventional gas laser device with the configuration described above suffers from problems as described below.

Because the device has Simmer discharge, the discharge always has to be ignited even when the laser pulse operation is not being carried out and the efficiency is reduced.

SUMMARY OF THE INVENTION

Accordingly, one object of this invention is to provide a gas laser device which can improve the laser oscillation efficiency.

Other object of this invention is to provide a gas laser device which can improve the laser oscillation efficiency simply by establishing appropriate power source conditions, or discharge conditions including the electrode structure and laser gas pressure.

Another object of this invention is to provide a gas laser device which is small in size and is provided with a high overall efficiency and an outstanding laser pulse characteristic.

These and other objects of this invention can be achieved by providing a gas laser device, including an a.c. power source for generating a.c. output voltage and a pair of electrodes positioned sandwiching discharge gap through which laser gas circulates. The pair of electrodes are connected to the a.c. power source for applying the a.c. voltage across the electrodes to achieve discharge in the discharge gap such as to create a positive column region and boundary layer regions, thereby to generate laser light. The positive column region is created in the discharge gap and a.c. power injected therein contributes to laser excitation. The boundary layer regions is created in a vicinity of one of the pair of electrodes, respectively and a.c. power injected therein does not contribute to laser excitation. A frequency of the a.c. power source is set to at least 700 kHz and an a.c. output voltage of the a.c. power source is set at a level such that a voltage in the positive column region is larger than a burden or load voltage in the boundary layer regions.

In the gas laser device, it may be set that a dimension d between the pair of electrodes and a pressure p of the laser gas in the relationship of the following formula (A)

$$p \times d \geq 34 \text{ torr-cm} \quad (A)$$

As a result the input power supplied for laser excitation in the discharge gap is at least 50% of a total input power.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
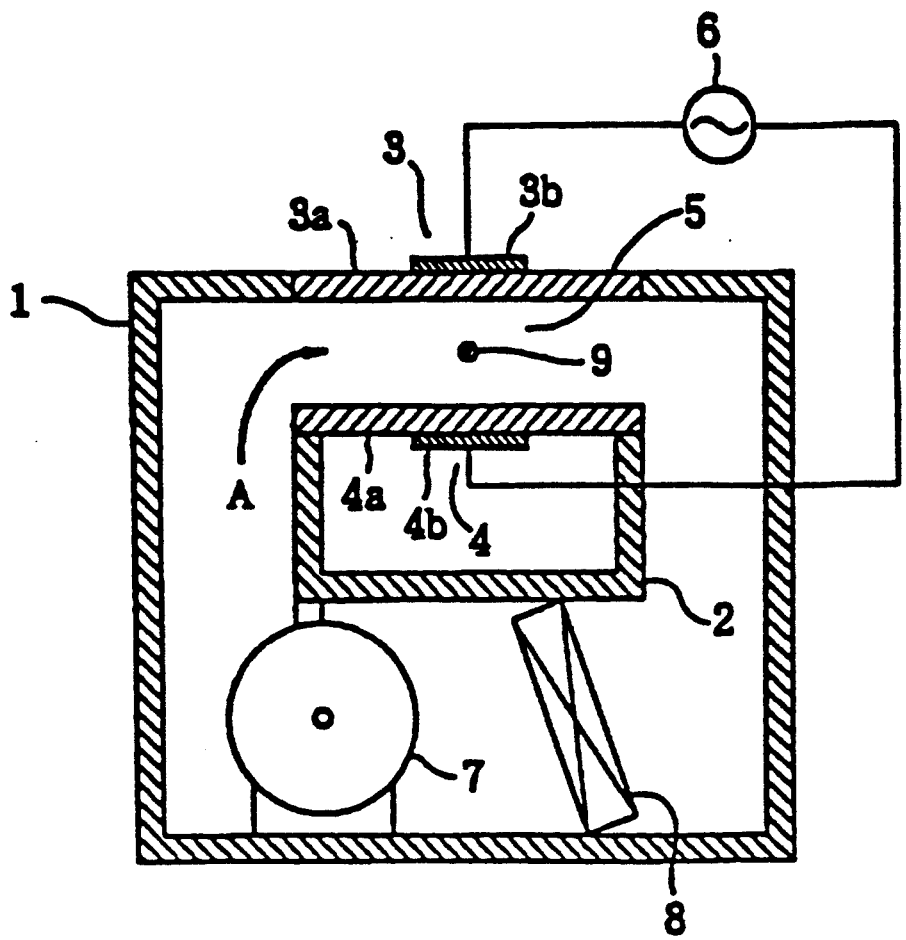
FIG. 1 is a diagram showing a conventional gas laser device.
Figure 4:
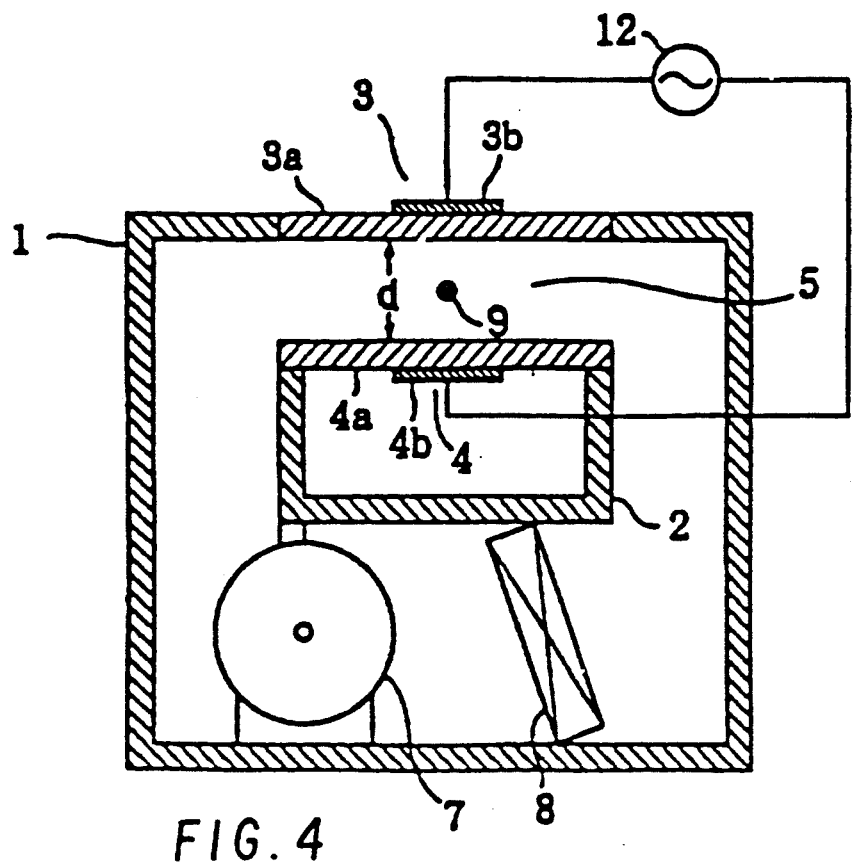
FIG. 4 is a diagram showing a gas laser device according to an embodiment of this invention.

An explanation of a first embodiment of the present invention is given below with reference to the drawings. FIG. 4 shows the longitudinal cross-sectional structure of a so-called cross-flow type gas laser device in which the gas flow is orthogonal to the output optical axis, and the configuration is largely the same as the conventional configuration shown in FIG. 1 so that the explanation has been curtailed by giving identical references to identical parts. In other words, the difference between FIG. 4 and the conventional configuration is that an a.c. power source 12 is used in place of the a.c. power source 6.

Figure 2:
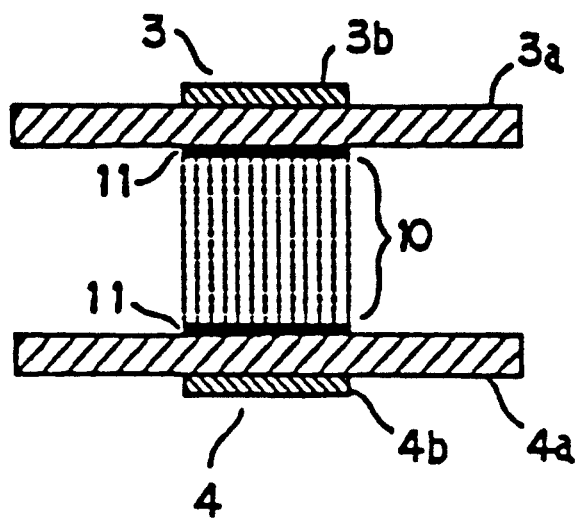
FIG. 2 is a diagram showing diagrammatically the physical structure of the discharge in the discharge gap.
Figure 3:
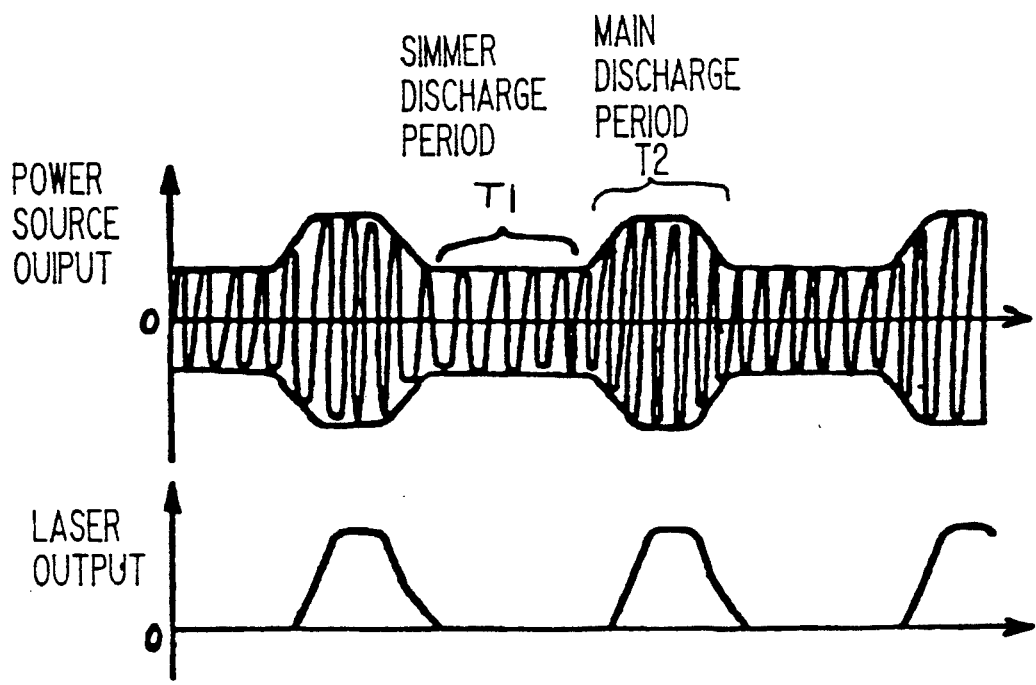
FIG. 3 is a diagram showing the relation between the a.c. power source output and the laser output of the conventional gas laser device.
Figure 5:
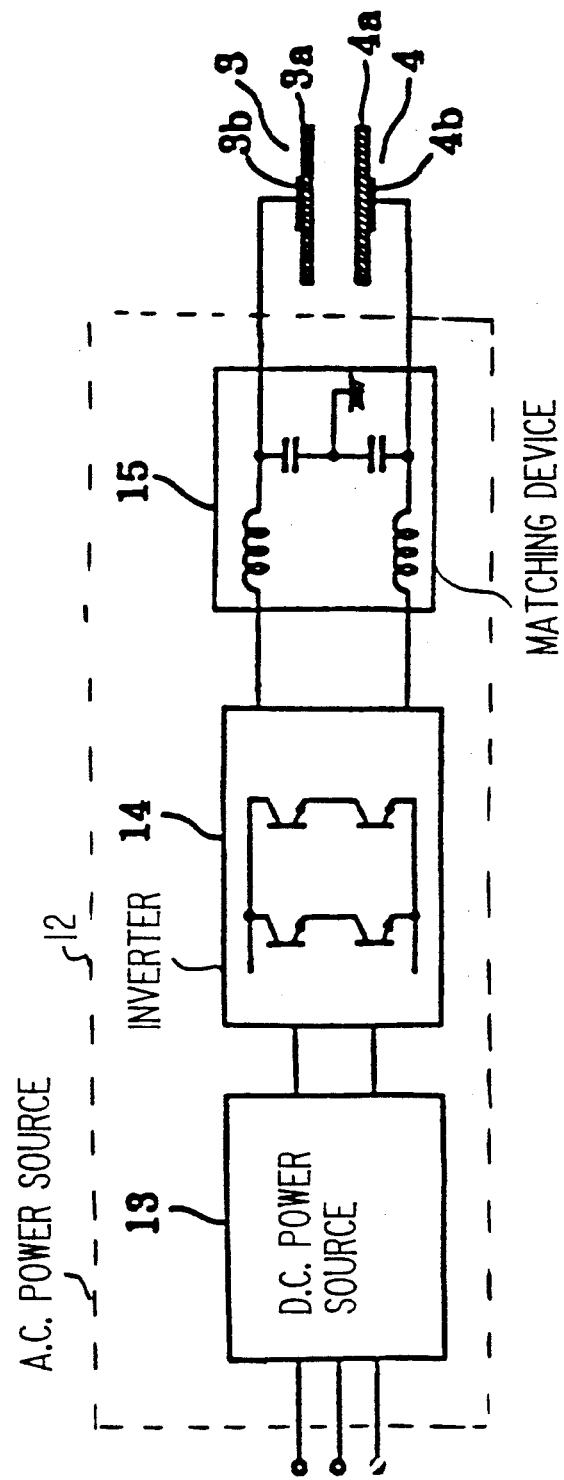
FIG. 5 is a schematic diagram showing an a.c. power source according to an embodiment of this invention.

FIG. 5 shows an outline of the a.c. power source 12. The configuration in FIG. 5 is such that a three-phase 200 V a.c. input is supplied to an inverter 14 via a d.c. power source 13 so that a high-frequency voltage with a frequency of at least 700 kHz is output from this inverter 14. The connections are such that the high-frequency output is supplied to the electrodes 3b and 4b of the first and second dielectric electrodes 3 and 4 through a matching device 15. Further, the output voltage from the inverter 14 is set at a level where the voltage Vc at the positive column 10 shown in FIG. 2 is larger than the burden voltage (normally 450 V at the r.m.s. value) in the region of the boundary layer 11 which does not contribute to laser excitation: for example at a level of 1,350 V (r.m.s. value), which is the level at which the voltage Vc of the positive column 10 is three times the burden or load voltage in the region of the boundary layer 11.

Moreover, the d.c. power source 13 includes a circuit which rectifies and smooths the a.c. input and a pulse width modulating d.c. conversion circuit, and the level and the pulse of the high-frequency power supplied to the electrodes 3b and 4b are controlled. Further, the inverter 14 uses a static induction transistor (SIT) as the principal circuit element for switching. The detailed construction of the a.c. power source 12 will be described later.

Figure 6:
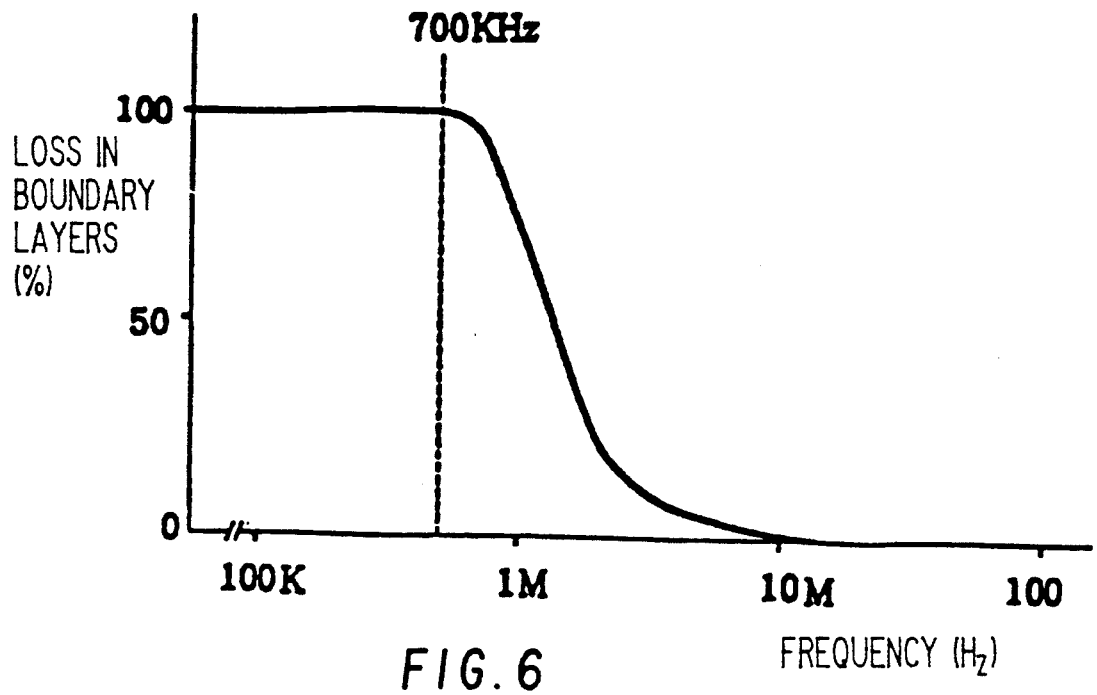
FIG. 6 is a graph of the loss characteristic in the boundary layer region.

FIG. 6 shows the relationship between the power source frequency (discharge frequency) and losses in the region of the boundary layer 11 in a typical $CO_2$ laser. In FIG. 6, the displacement current component is decided to be constant (5 mA./cm$^2$).

When an a.c. voltage is applied from the a.c. power source 12 across the pair of electrodes 3b and 4b, an a.c. discharge is produced between these electrodes 3b and 4b and the laser gas circulating through the discharge gap 5 is therefore excited and laser light produced. As shown in FIG. 2, the composition of the discharge between electrodes 3b and 4b in this state involves a state made up of the positive column 10 and the boundary layers 11. Here, when the frequency of the a.c. power source 12 is low, the current flowing through the region of the boundary layer 11 is the conducted current component added to the displacement current component so that the power loss is increased. In the case of this embodiment, as the frequency of the a.c. power source 12 has been set to at least 700 kHz, the some part of the current flowing in the region of the boundary layer 11 is the displacement current so that power losses are reduced and the laser pulse characteristics are improved.

When a configuration is adopted, as in the present embodiment, in which the output voltage of the inverter 14 is set at a level such that the voltage Vc of the positive column 10 is at least three times the burden voltage in the region of the boundary layer 11, the input power supplied for laser excitation in the discharge gap 5 is at least 75% of the overall input power, and the laser generation efficiency is generally improved.

Moreover, the output voltage of the inverter 14 should be at a level where the voltage of the positive column 10 is larger than the burden voltage (normally 450 V at the r.m.s. value) in the region of the boundary layer 11, and, if it has been set at such a level, the input power supplied for laser excitation in the discharge gap 5 is 50% of the overall input power so that the laser oscillation efficiency can be raised to an adequate level for practical purposes.

Next, a second embodiment of the present invention will be described with reference to the drawings. In this embodiment shown in FIG. 4, the relationship between the dimension d between the first dielectric electrode 3 and the second dielectric electrode 4 and the pressure p of the laser gas enclosed in the gap between the outer flume 1 and the inner flume 2 is set as in the following formula.

$$pxd \geq 103 \text{ torr-cm}$$

When such a relationship has been established, the input power supplied for laser excitation in the discharge gap 5 can be at least 75% of the overall input power as same as in the first embodiment, the reasons are explained hereinbelow.

Figure 7:
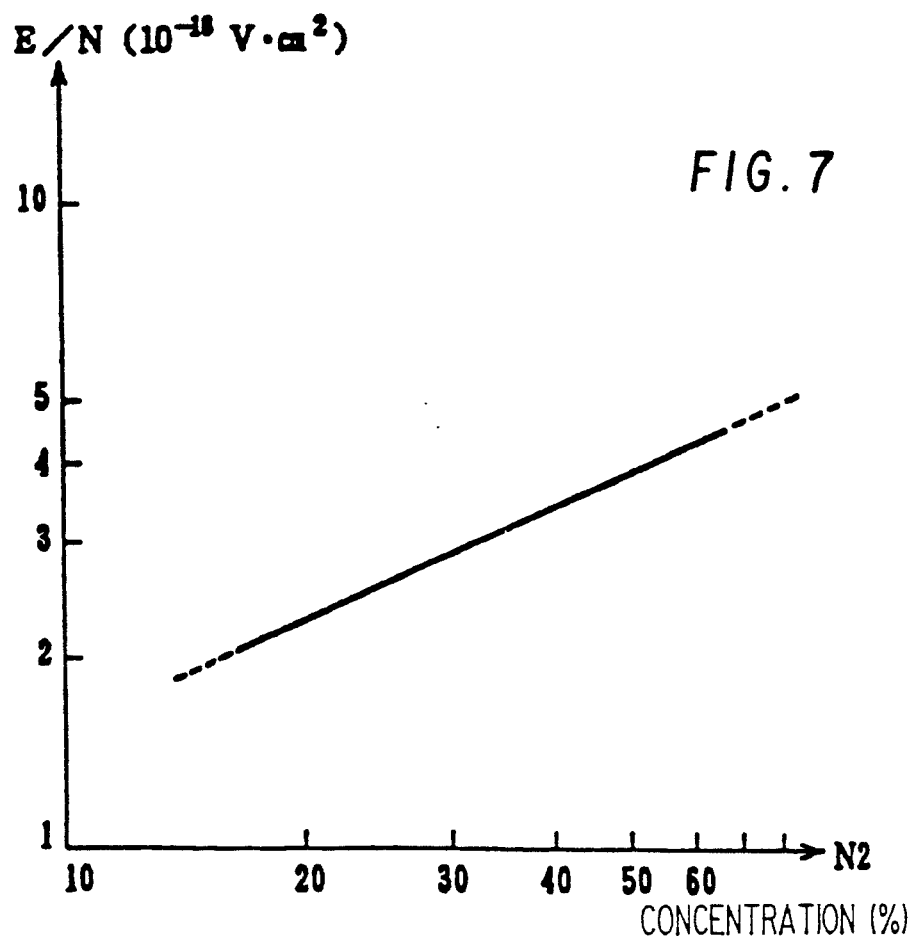
FIG. 7 is a characteristic graph to explain the operation.

In FIG. 7, the relationship between the proportion of $N_2$ and the conversion electrical field per molecule E/N in the positive column 10 (power source frequency of 700 kHz) has been found experimentally for general $CO_2$ lasers which use a gas mixture of $CO_2$, $N_2$ and He as the laser gas.

For example, $E/N = 4.1 \times 10^{-16}$ (V·cm$^2$) when the $N_2$ concentration is 60%. With a laser gas pressure p of 50 torr and a temperature T of 300° K., the molecular number N per unit volume is obtained, using the state equation for an ideal gas (where k is Boltzmann's constant), by $$\begin{aligned} N &= P/kT \\ &= 50 \times 133.3/(1.38 \times 10^{-23} \times 300) \\ &= 1.61 \times 10^{18} \text{ (/cm}^3\text{)}. \end{aligned}$$

The following equation need only be satisfied to obtain a positive column voltage Vc of at least 1,350 V as in the embodiment given above.

$$Vc = d \times (E/N) \times N \geq 1,350$$

In other words, all that needs to be done is to satisfy the relationship $d \times 4.1 \times 10^{-16} \times 1.61 \times 10^{18} \geq 1,350$, which gives $d > 2.05$ cm. Because the pressure p of the laser gas is 50 torr, the input power supplied for laser excitation in the discharge gap 5 can ultimately be at least 75% of the overall input power if the relationship $pxd \geq 103$ torr cm is satisfied, and the same results as in the first embodiment above can be obtained.

Moreover, when the N concentration is lower than 60%, E/N tends to reduce as shown in FIG. 7, which can therefore be countered by increasing d with the result that an improvement is achieved by satisfying $pxd \geq 103$ torr cm.

Further, in order to make the positive column voltage Vc larger than the burden voltage (normally 450 V at the r.m.s. value) in the region of the boundary layer 11 one need only satisfy $d \times (E/N) \times N \geq 450$, giving $d \geq 0.68$ cm. As a result, the input power supplied for laser excitation in the discharge gap 5 can be at least 50% of the overall input power by adopting configuration satisfying the relationship in the following in the following formula (A), and the laser oscillation efficiency can also be adequately improved in this case too.

$$pxd \geq 34 \text{ torr-cm} \quad (A)$$

As is clear from the above description, the first embodiment of the present invention provides the outstanding advantage that the high laser oscillation efficiency can be achieved simply by setting the power source voltage conditions which is to say setting the frequency of the a.c. power source for supplying discharge power to at least 700 kHz and also setting the output voltage of the a.c. power source to a level such that the positive column voltage created in the discharge space is larger than the burden (load) voltage in the region of the boundary layer, or by setting discharge conditions including the electrode structure and the laser gas pressure which is to say setting the frequency of the a.c. power source to at least 700 kHz and setting the relationship between the dimension d between the pair of electrodes and the laser gas pressure p at $pxd \geq 34$ torr·cm.

Next, a third embodiment of this invention will be described with reference to the drawings.

Figure 8:
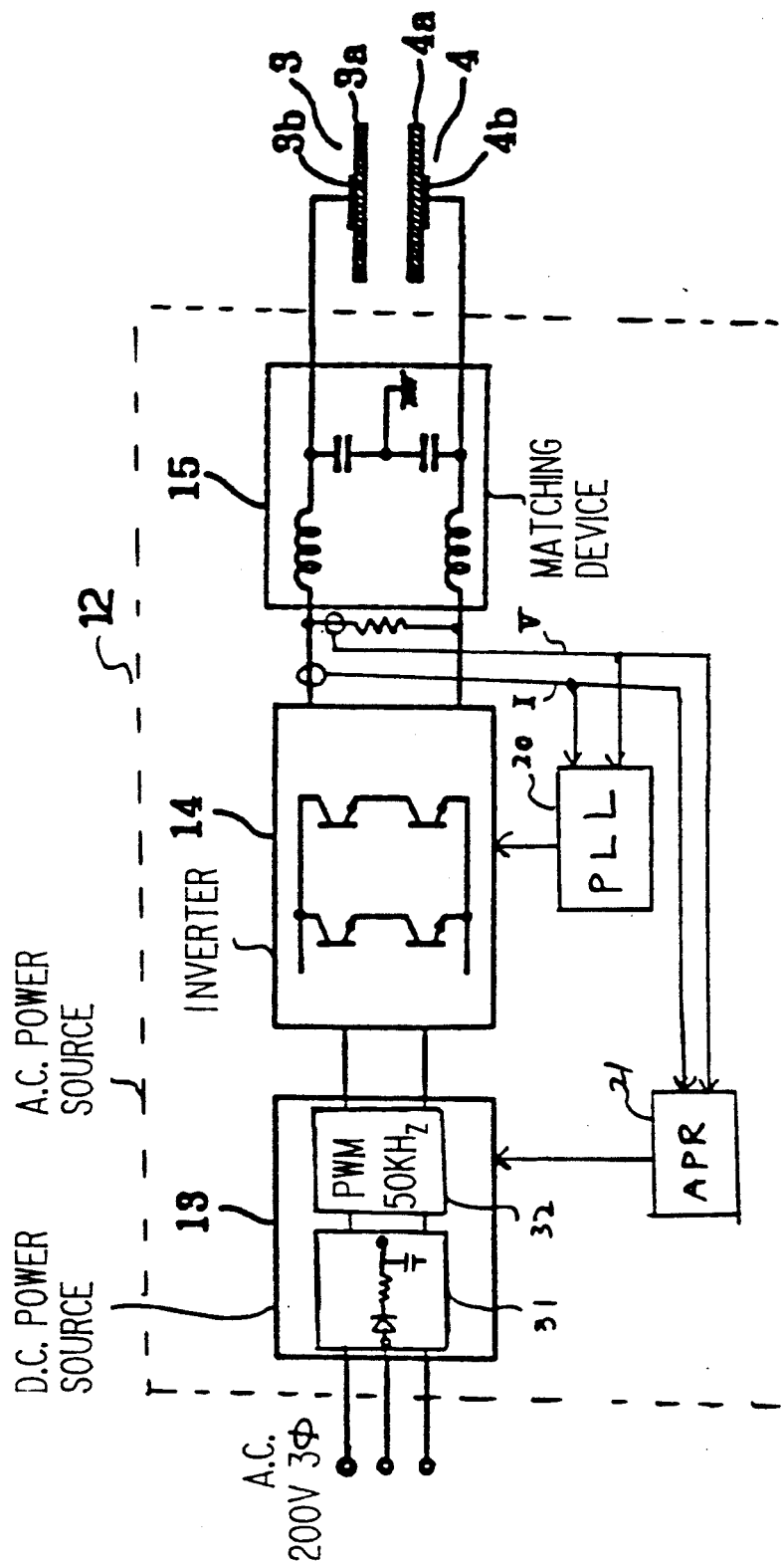
FIG. 8 is a diagram showing an a.c. power source according to an embodiment of this invention.

FIG. 8 is a diagram showing precisely an a.c. power source according to the third embodiment. In FIG. 8, a three-phase 200 V a.c. input is supplied to the inverter 14 via the d.c. power source 13 so that a high frequency voltage with a frequency of at least 700 kHz is output from the inverter 14. The high frequency output is supplied to the electrodes 3b and 4b of the first and second dielectric electrodes 3 and 4 through the matching device 15. The d.c. power source 13 includes a circuit 31 which rectifies and smooths the 200 V a.c. input and a pulse width modulating (PWM) d.c. conversion circuit 32, and controls the level and the pulse of the high frequency power supplied to the electrodes 3b and 4b. Further, the inverter 14 uses a static induction transistor (SIT) as the principal circuit element for switching.

The a.c. power source 12 further includes a phase locked loop (PLL) circuit 20 and an automatic power regulator (APR) circuit 21. The PLL circuit 20 monitors the waveforms of the voltage and current of the output of the inverter 14 to vary the frequency of the output. As a result, the PlL circuit 20 controls such that the phases of both waveforms to be constant and keeps the matching state in the case of the change of the discharge load. This facilitates to give the high-frequency power to the discharge load with high efficiency. The APR circuit 21 performs a feedback control to keep the high frequency output power to be constant by monitoring the voltage and current of the output of the inverter 14 and applying them to the d.c. power source 13. The construction of the each circuit described above is well known to those skilled in the art, so that the precise description thereof will be omitted.

As described above, by setting the discharge frequency at least 700 kHz, it is possible to raise the laser excitation efficiency. Thus the laser oscillation efficiency (laser output/discharge input) can be raised. Moreover, the discharge frequency is high so that the laser pulse characteristic are also improved.

Conventionally, in the case that the discharge frequency is high the a.c. power source of the vacuum tube type has been used. But it suffers from the drawback that the size of the a.c. power source is large and the overall efficiency of the gas laser device can not be raised.

In order to reduce the size of the a.c. power source and to raise the power source efficiency, it is necessary to use the solid state device for switching in the a.c. power source.

Conventionally, a power MOS FET has been used as the solid state device in the a.c. power source. But as the power capacity per device is low at the above-described discharge frequency, it is necessary to use more than 10 devices for switching in one arm in a bridge circuit in the a.c. power source. Moreover, additional measures are necessary to compensate the variation between the operation characteristics of the devices. As a result, the construction of the bridge circuit has been complicated and the size thereof has been large.

Even though many device are used in the a.c. power source, an output power per unit of the a.c. power source is at most 1 to 2 kW in the case of continuous operation.

As for the a.c. power source of the gas laser device, in order to improve the laser pulse characteristic, it is better to reduce the number of the units as far as possible for constructing the a.c. power source which supplies power to the electrodes. Especially in the case of the cross-flow type gas laser device, if the electrodes are constructed by many divided electrodes a certain distance between the electrodes is necessary to suppress the abnormal discharge between the divided electrodes, which results in that the gas laser device is large in size and the efficiency thereof is reduced. Accordingly, it is desirable to construct the a.c. power source with one unit to supply power to the electrodes.

In general, the gas laser device with output power of more than 500W is frequently used for the $CO_2$ laser for working use. As the laser oscillation efficiency of the device is about 12.5%, for the output power capacity per unit of the a.c. power source at least 4 kW (the power in the CW operation or the average power during the pulse operation) is necessary. It is impossible to construct the a.c. power source with the power MOS-FETs the capacity of which is the above-described value.

In the a.c. power source with the static induction transistors (SIT) according to the embodiment of this invention, it is possible to construct the a.c. power source the capacity of which is more than 4 kW by constructing each arm of the bridge circuit with one or two SITs.

Accordingly, the a.c. power source with the capacity of more than 40kW can be realized by constructing each arm of the bidge circuit with 10 SITs. Moreover, SIT is suitable for the solid state device for the gas laser discharge use because SIT is superior in the withstand surge characteristic.

As described above, according to the embodiment the losses in the boundary layer region are reduced by setting the discharge frequency more than 700 kHz, which raises the laser oscillation efficiency. In addition, large capacity solid state devices are used for switching in the a.c. power source, which enables the capacity of the a.c. power source large and raises the efficiency of the a.c. power source. Thus, the embodiment can provide the gas laser device with a high overall efficiency and an outstanding laser pulse characteristic in a small size.

The present invention is not limited to the above-described embodiment. It is also applied to an axial-flow type laser or a heat conduction cooling type laser. In this case, it is possible to get laser light with excellent pulse characteristic by supplying the high frequency power from the a.c. power source with one unit to a plurality of discharge tubes.

In the case that the a.c. power source with one unit supplies high-frequency power to a pair of a electrodes, one unit may be constructed by a plurality of subunits. Namely, each subunit includes an inverter circuit, the bridge circuit in which are constructed with high capacity solid state devices. Assuming that the high-frequency output of each subunit is 20 kW, the a.c. power source with a unit constructed by four subunits can generates very large high frequency output such as 80 kW.

In the embodiment of this invention, SIT is used for high-speed, high capacity solid state device. But other type high-speed and high capacity solid state device can be used instead of SIT.

Next, a fourth embodiment of the present invention will be described with the drawings. This embodiment is characterized in that the gas laser device also has an a.c. power source carrying out a laser pulse operation by giving rise to the phenomenon of electron trapping in the discharge gap between the discharge electrodes by turning the high-frequency a.c. voltage at the discharge electrodes on and off.

The phenomenon of electron trapping arises if a high-frequency a.c. voltage is applied across the discharge electrodes by the a.c. power source. This phenomenon of electron trapping occurs under the conditions discussed below.

Figure 9:
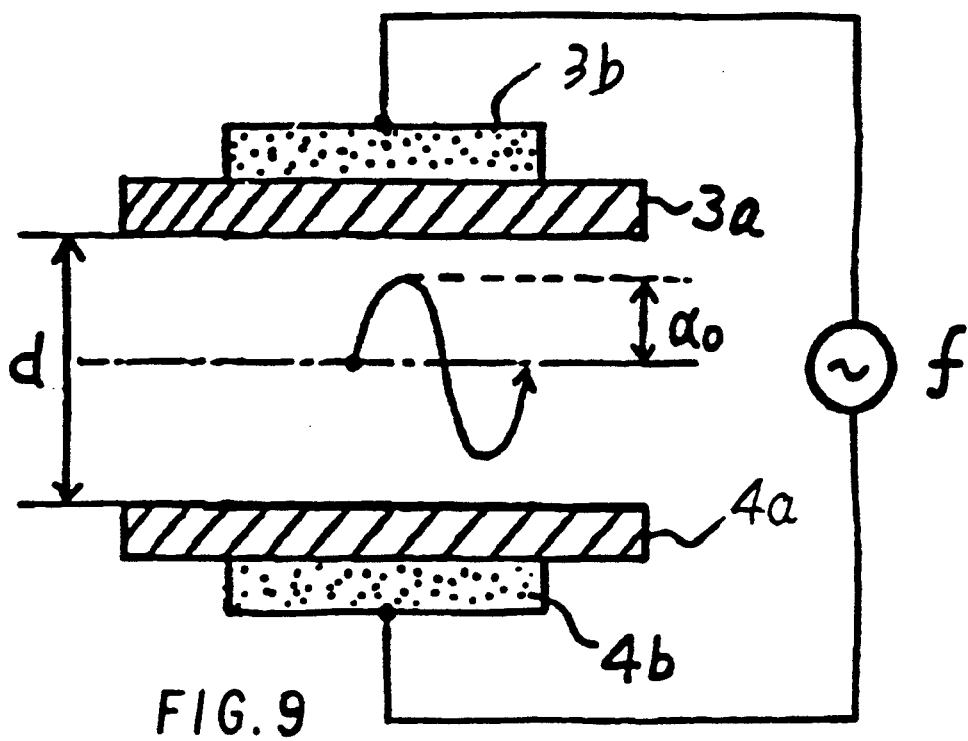
FIG. 9 is a diagram explaining the phenomenon of electron trapping in the gap between the electrodes of the gas laser device.

FIG. 9 is a figure explaining the phenomenon of electron trapping in the gap between the discharge electrodes. At a discharge frequency f, which is the frequency of the high-frequency a.c. voltage applied across the discharge electrodes, the amplitude $a_0(m)$ of the electrons being discharged present in the discharge gap can be expressed by the following formula.

$$a_0 = \frac{Vd}{2\pi f} \ (m) \tag{1}$$

In a general gas laser device, though the electron drift velocity vd (m/s) varies depending on the gas mixing ratios, it is $vd \geq 3 \times 10^4$, which can be substituted into formula (1) to obtain:

$$a_0 \geq \frac{3 \times 10^4}{2\pi f} \ (m) \tag{2}$$

If a discharge gap length of d (m) is adopted here, then the phenomenon of electron trapping will arise, whereby there are always electrons in the discharge gap, when the following formula is satisfied since the discharge gap length is longer than the vibrational amplitude range of the electron as shown in FIG. 9.

$$d \geq 2a_0 \tag{3}$$

The following formula can be derived from formulas (2) and (3) as the formula for the conditions under which the phenomenon of electron trapping arises.

$$d \geq 3 \times 10^4 / \pi f \ (m) \tag{4}$$

Discharge ignition is facilitated when the phenomenon of electron trapping occurs since there are always electrons in the discharge gap, and there is no need for a preliminary ionization means such as Simmer discharge since the discharge ignition voltage is reduced. This effect is more pronounced the higher the discharge frequency.

Figure 10:
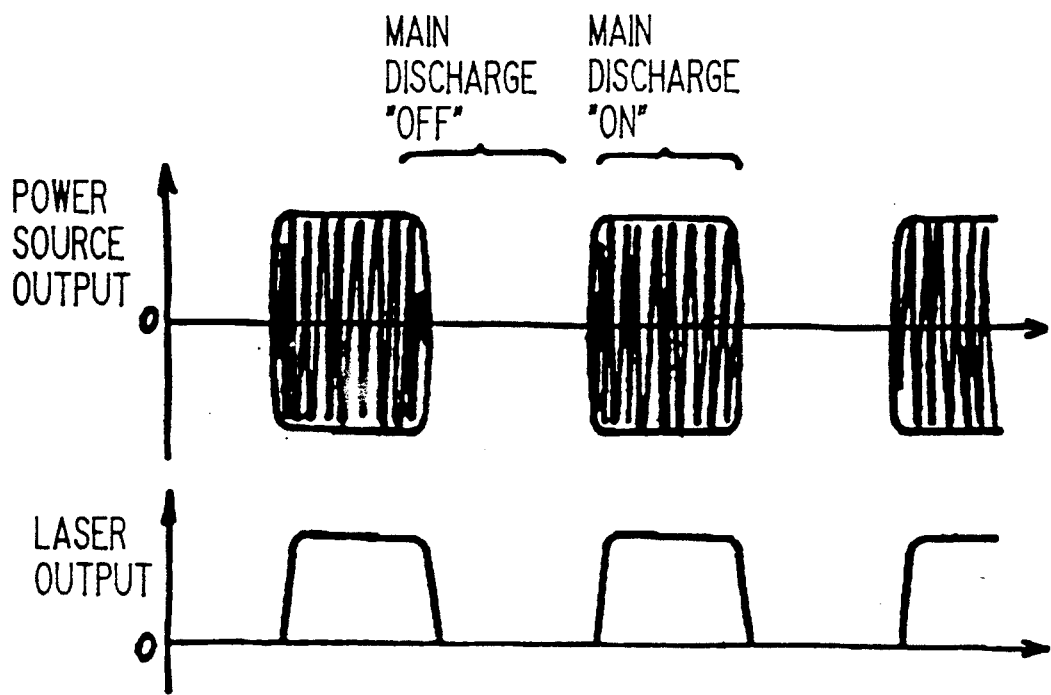
FIG. 10 is a diagram showing the relation between the a.c. power source output and the laser output of the embodiment of this invention.

The embodiment of the present invention therefore uses this action positively and is thus able to provide a gas laser device with a high overall efficiency and an outstanding laser pulse characteristic which achieves a laser pulse operation able to obtain a laser output as shown in FIG. 10 simply by turning the a.c. power source on and off.

An embodiment of the present invention is explained in detail below with reference to the drawings. Parts which duplicate those in the example of the prior art have not been explained. FIG. 4 shows the configuration of a gas laser device according to the embodiment of this invention, in which the discharge gap $d=9.5$ (mm), and the a.c. power source 12 has an output frequency $f=1$ MHz.

This figure has been calculated from the operation discussed below. Assuming that the a.c. power source has an output frequency $f=1$ MHz, if this figure is substituted into Formula (4), the formula for the conditions under which the phenomenon of electron trapping occurs, the result is:

$$d \geq (3 \times 10^4)/(\pi \times 10^6) = 0.0095 \ (m).$$

In laser excitation, the discharge frequencies able to reduce power losses in the boundary layer region or the discharge electrode lie at 700 kHz and above. Therefore, the output frequency f of the a.c. power source 9 in this embodiment has been set at 1 MHz. Thus the discharge gap length d and the output frequency r of the a.c. power source 12 are set so as to create the phenomenon of electron trapping.

The operation of the gas laser device of an embodiment having this configuration is discussed below. Because the discharge gap length and the output frequency of the a.c. power source 12 are set as described previously, the phenomenon of electron trapping occurs across the discharge gap. Discharge ignition is therefore facilitated and the discharge ignition voltage is lowered since there are always electrons in the discharge gap, and a laser pulse operation can therefore be achieved merely by turning the a.c. power source 12 on and off directly without a preliminary ionization means such as Simmer discharge or trigger discharge.

The laser excitation efficiency can be increased since the output frequency f of the a.c. power source 12 is set at 1 MHz which a discharge frequency above 700 kHz at which level power loss in the electrode layer region of the discharge electrodes can be reduced.

The present invention also allows for a reduction in the scale and an increase in the efficiency of the laser device since the switching- operation is carried out using a solid element in the a.c. power source. When a solid element is used, the initial discharge voltage during discharge ignition is higher than the normal operational value, and the solid element therefore needs to have a high anti-surge characteristic. Assuming a discharge frequency of 1 MHz, the instantaneous current flowing in the solid element during discharge ignition is 2 to 2.5 times that during discharge. Taking this into consideration, a static induction transistor (SIT) is ideal.

Moreover, the present invention is not limited to the embodiment discussed above, and it may involve an axial-flow laser.

Further, in this embodiment impedance matching was achieved between the a.c. power source and the laser load by making the frequency variable, but the laser output may also be controlled by adjusting the constant for the matching device near to the value during maximum output and rendering the pulse duty for pulse frequencies of 10 kHz or above variable.

Moreover, in the present embodiment a static induction transistor (SIT) was used as the solid element having a high anti-surge characteristic, but other solid elements may also be used.

The present embodiment gives a small-scale gas laser device with a high overall efficiency and outstanding laser pulse characteristics by carrying out the laser pulsing operation simply by turning the high-frequency power source on and off.

Finally, the present embodiments have been discussed referring to a gas laser device. But the present invention is not limited to the embodiments and an equivalent performance is also obtained if the invention is applied to a laser amplifier and the invention can also be applied to other gas lasers such as CO lasers and excimer lasers.

Obviously, numerous modifications and variations of the present invention are possible in light of the above teachings, it is therefore to be understood that within the scope of the appended claims, the invention may be practiced otherwise than as specifically described herein.

What is claimed is:

1. A gas laser device, comprising:
   a.c. power source means for generating a.c. output voltage; and
   a pair of electrodes positioned sandwiching a discharge gap through which laser gas circulates;
   said pair of electrodes being connected to said a.c. power source means for applying said a.c. voltage across said electrodes to achieve discharge in said discharge gap such as to generate a positive column region and boundary layer regions, thereby to generate laser light;
   said positive column region being generated in said discharge gap and a.c. power injected therein contributing to laser excitation;
   said boundary layer regions being generated in a vicinity of one of said pair of electrodes, respectively and a.c. power injected therein not contributing to laser excitation;
   a frequency of said a.c. power source means being set to at least 700 kHz; and
   an a.c. output voltage of said a.c. power source means being set at a level such that a voltage in said positive column region is larger than a load voltage in said boundary layer regions, whereby the efficiency of the gas laser device is increased.

2. A gas laser device, comprising:
   a.c. power source means for generating a.c. output voltage; and
   a pair of electrodes positioned sandwiching a discharge gap through which laser gas circulates;
   said pair of electrodes being connected to said a.c. power source means for applying said a.c. voltage across said electrodes to achieve discharge in said discharge gap such as to generate a positive column region and boundary layer regions, thereby to generate laser light;
   said positive column region being generated in said discharge gap and a.c. power injected therein contributing to laser excitation;
   said boundary layer regions being created in a vicinity of one of said pair of electrodes, respectively and a.c. power injected therein not contributing to laser excitation;

a frequency of said a.c. power source means being set to at least 700 kHz; and setting a dimension d between said pair of electrodes and a pressure p of said laser gas in the relationship of the following formula:

$$p \times d \geq 34 \text{ torr-cm}$$

whereby input power supplied for laser excitation in said discharge gap is at least 50% of a total input power, whereby the efficiency of the gas laser device is increased.

3. The gas laser device according to claim 1 or 2, wherein: said a.c. power source means includes a plurality of power unit; and high frequency power output per power unit is at least 4 kW.

4. The gas laser device according to claim 1 or 2, wherein: said a.c. power source means includes a solid state device used as a switch.

5. The gas laser device according to claim 3, wherein: said a.c. power source means includes a static induction transistor for said solid state device.

6. The gas laser device according to claim 1 or 2, wherein: said a.c. power source means carries out a laser pulse operation by giving rise to a phenomenon of electron trapping in said discharge gap between said electrodes by turning said a.c. output voltage at said electrodes on and off.

7. The gas laser device according to claim 1 or 2, wherein: a length d of said discharge gap between said pair of electrodes is given by the equation $d \geq 3 \times 10^4 \pi f$ wherein f is equal to the discharge frequency; and said a.c. power source generates a laser pulse simply by turning said a.c. output voltage on and off.

8. The gas laser device according to claim 6, wherein: said a.c. power source means includes a solid state device used as a switch.

9. The gas laser device according to claim 7, wherein: said a.c. power source means includes a solid state device used as a switch.

10. The gas laser device according to claim 1 or 2, wherein:

said gas is $CO_2$ gas; and said gas laser device of a cross-flow type.

* * * * *